United States Patent [19]
Jones

[11] 3,782,323
[45] Jan. 1, 1974

[54] SELF CONTAINED FLUIDIC LEVEL SENSOR

[75] Inventor: Donnie Roland Jones, Silver Spring, Md.

[73] Assignee: Bowles & Fluidics Corporation, Silver Spring, Md.

[22] Filed: June 9, 1972

[21] Appl. No.: 261,381

[52] U.S. Cl................. 116/118 R, 73/302, 137/558
[51] Int. Cl. .............................................. G01f 23/00
[58] Field of Search...................... 116/118; 73/302, 73/299, 303; 137/557, 558

[56] References Cited
UNITED STATES PATENTS

| | | | |
|---|---|---|---|
| 1,431,516 | 10/1922 | Fox | 73/302 |
| 1,508,969 | 9/1924 | Guichard | 73/302 X |
| 2,067,767 | 1/1937 | Kollsman | 73/302 |
| 2,030,163 | 11/1942 | Hall | 116/118 R |
| 2,418,614 | 4/1947 | Annin | 73/302 |

Primary Examiner—Louis J. Capozi
Attorney—Howard L. Rose et al.

[57] ABSTRACT

A pressure pulse, selectively initiated from the dashboard of a motor vehicle, is applied to two compartments separated by a diaphragm. One compartment is vented and receives the pressure pulse via a sensor tube extending toward the diaphragm. The second compartment communicates with a dip tube extending to the sensing level in the vehicle oil reservoir. If the oil is above the dip tube, the diaphragm is flexed by the pressure pulse and blocks the sensor tube so that the pulse cannot be vented. The pulse is thus shunted to a pressure responsive indicator which provides a momentary indication that the oil level is above the sensing level. If the oil is below the dip tube, the pressure pulse is vented through the dip tube and sensor tube, rendering the indicator unactuated.

10 Claims, 2 Drawing Figures

PATENTED JAN 1 1974  3,782,323

3,782,323

SELF CONTAINED FLUIDIC LEVEL SENSOR

BACKGROUND OF THE INVENTION

The present invention relates to liquid level sensors and, more particularly, to inexpensive level sensors capable of permitting selective monitoring of motor oil level from the dashboard of a motor vehicle.

The most widely used method of checking the level of motor oil in a vehicle involves the use of a removable dip stick. According to this well-known method, the dip stick must be removed, wiped clean, re-inserted into the oil reservoir, and removed again so that oil level on the stick can be observed. The disadvantages of this method are many including inconvenience, the tendency to soil clothes and the fact that it is impossible to perform the method at night in unlit areas.

Prior art attempts to provide improved methods of measuring motor oil level have not been successful. The oil pressure light in most vehicles cannot be accurately calibrated, and in any event serves only as a warning of impending disaster. Considerable damage may occur to the vehicle engine, due to a continuing low oil level, before the oil pressure light is lit. Other approaches have proved too expensive to warrant replacement of the dip stick approach, and some have required too much additional drain on the vehicle battery.

It is an object of the present invention to provide an inexpensive method and apparatus to permit the motor oil level in a motor vehicle to be checked at will from inside the passenger compartment.

It is another object of the present invention to provide a method and apparatus to permit the level of motor oil and other vehicle liquids to be monitored from inside the passenger compartment without additional current drain from the vehicle battery.

SUMMARY OF THE INVENTION

The present invention attains the aforesaid objects by employing a diaphragm separating two chambers. A pressure pulse is manually initiated at the dashboard and applied to one vented chamber through a sensor tube and to the other closed chamber through a restrictor. The sensor tube projects toward the diaphragm and is blocked when the diaphragm is flexed. The sensor tube also communicates with a pressure-actuated indicator, located at the dashboard, which is by-passed unless the sensor tube is blocked. The other chamber communicates with a dip tube extending to the sensing level of the motor oil or other liquid. When the oil is above the sensing level of the dip tube, the pressure pulse flexes the diaphragm, thereby blocking the sensor tube and actuating the indicator. When the oil level is below the sensing level the pressure pulse is vented via the dip tube and the vented chamber.

A plurality of dip tubes, one for each vehicle liquid, can be selectively connected to the other chamber via a selector switch located at the dashboard. In this manner, all vehicle liquid levels may be checked at will from inside the passenger compartment.

BRIEF DESCRIPTION OF THE DRAWINGS

The above and still further objects, features and advantages of the present invention will become apparent upon consideration of the following detailed description of specific embodiments thereof, especially when taken in conjunction with the accompanying drawings, wherein.

DESCRIPTION OF THE PREFERRED EMBODIMENTS

Figure 1:
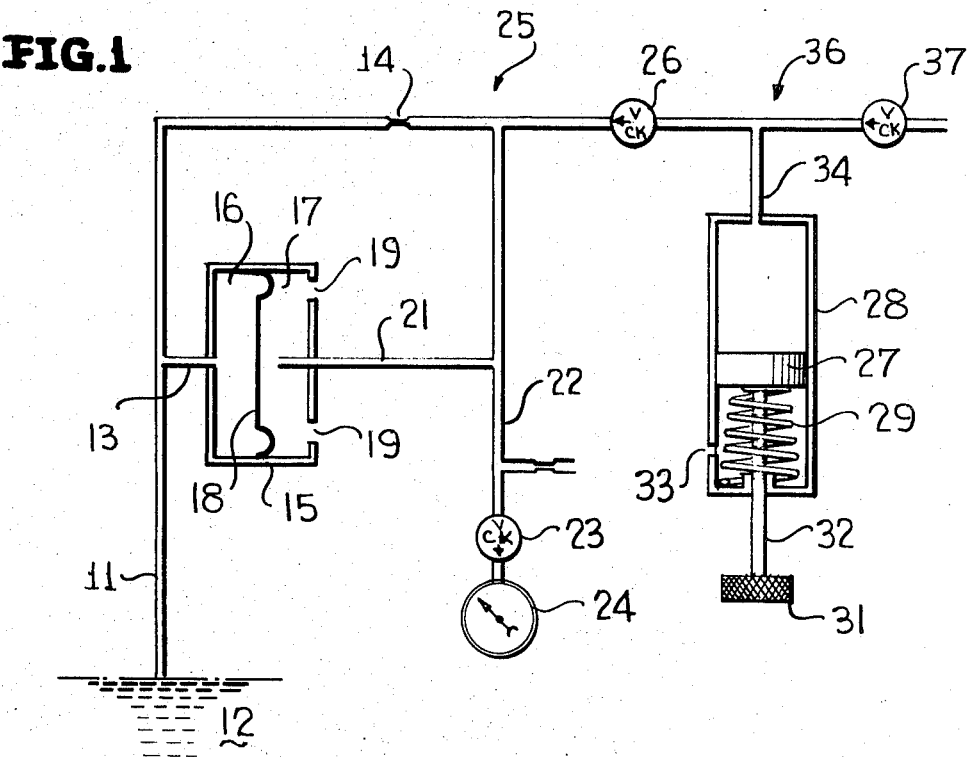
FIG. 1 is a schematic diagram of one embodiment of the present invention which is suitable for monitoring the motor oil level in a vehicle.
Figure 2:
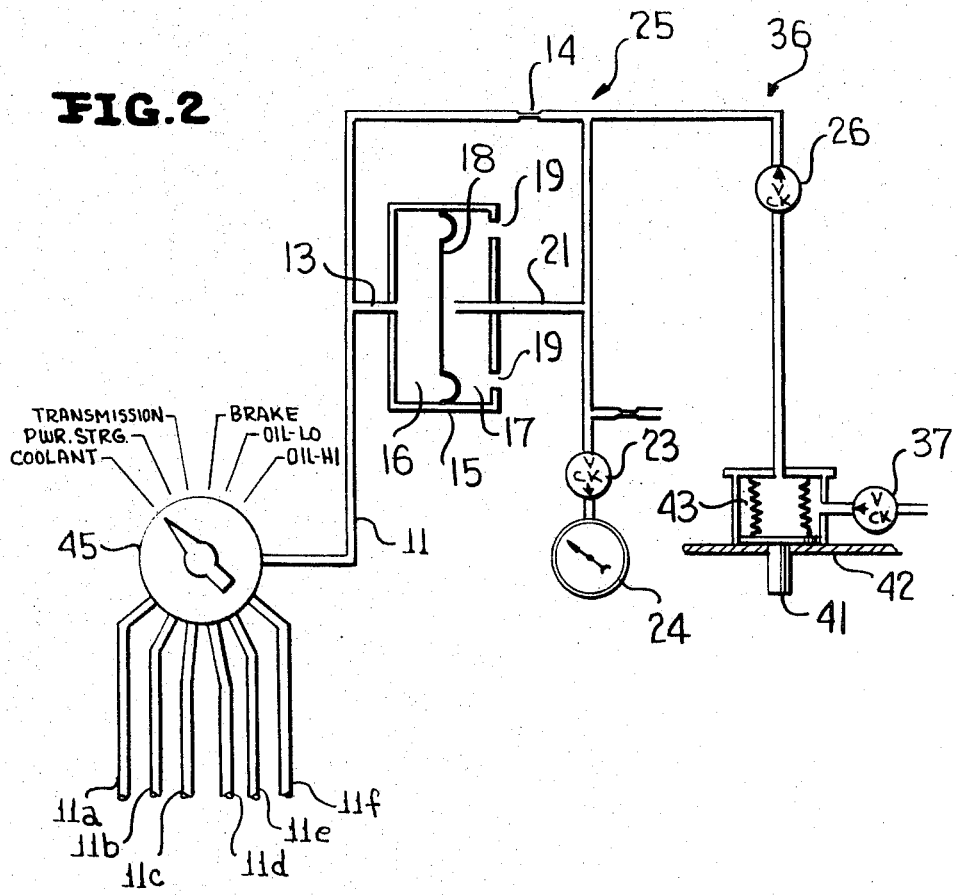
FIG. 2 is a schematic diagram of another embodiment of the present invention which is suitable for monitoring the levels of plural liquids used in a motor vehicle.

Referring specifically to FIG. 1 of the accompanying drawings, a hollow dip tube 11 extends down into a liquid reservoir such as a reservoir for motor oil 12 in a motor vehicle. The open lower end of dip tube 11 extends to the minimum level in the reservoir which the motor oil should attain for proper operation of the vehicle. The other end of dip tube 11 communicates with flow passage 13 and with flow restrictor 14. Passage 13 terminates in chamber or compartment 16 of a sensor device 15. The sensor device is an enclosed volume divided into pressure isolated chambers 16 and 17 by a flexible diaphragm 18. Chamber 16 receives and expels fluid only via passage 13, the chamber being otherwise unvented. Chamber 17 includes vent openings 19 and also receives a sensor tube 21 which extends through one wall of the chamber. The end of sensor tube 21 inside chamber 17 is positioned so as not to contact unflexed diaphragm 18 but is completely blocked when the diaphragm is flexed toward chamber 17.

The outside end of sensor tube 21 is connected to fluid passage 22 which is connected via check valve 23 to an indicator 24. The other end of tube 22 communicates with one leg of a T-connection 25, a second leg of which is connected to the side of restrictor 14 opposite dip tube 11. The remaining leg of T-connection 25 is connected to a pressure pulse supply via check valve 26.

The pressure pulse supply may take numerous forms. In the illustrated embodiment the supply comprises a piston 27, translatable in a cylinder 28, and to a retracted position by expansion spring 29. A knob 31 communicates with piston 27 via shaft 32 to permit the piston to be pulled back (down in FIG. 1) against the action of spring 29. The back end of cylinder 28 is vented by means of port 33; the forward end of the cylinder is connected via a fluid passage 34 to a T-connection 36, another leg of which feeds check valve 26. The remaining leg of T-connection 36 is connected to another check valve 37, the opposite side of which is vented.

Cylinder 28 is mounted on the dashboard of the vehicle with shaft 32 and knob 31 projecting from behind the dashboard into the passenger compartment. Indicator 24 is also mounted on the dashboard for viewing in the passenger compartment. The indicator may be any pressure-actuated device which shows one color or condition when not pressurized and another color or condition when pressurized. One such indicator would be the Model M–501–A panel indicator manufactured by the Bowles Fluidics Corporation, Silver Spring, Md.

Indicator 24 may also be an electrical indicator of the type which is actuated by pressure.

In operation, the vehicle operator pulls back on knob 31 and then releases. When piston 27 is pulled back, air is admitted into the forward end of cylinder 28 via ment and an engine compartment, wherein said initiator means, said indicator and said selector means are located in said passenger compartment and said dip tubes are located in respective reservoirs in said engine compartment.

7. The liquid level sensor according to claim 1 wherein said initiator means comprises a hollow cylinder having forward and rearward ends, a piston mounted to translation longitudinally inside said cylinder, bias means for urging said piston toward said forward end of said cylinder, and manually operable means for momentarily translating said piston toward the rearward end of said cylinder, whereby said piston, upon release by said manually operable means, is urged toward and expels said pressure pulse from said forward end of said cylinder.

8. The method of monitoring motor oil level in a motor vehicle, said method including the steps of:
generating a pressure pulse from a location inside the passenger compartment of said vehicle;
applying said pressure pulse to a dip tube having a sensor end disposed at a predetermined level in a reservoir for said motor oil; and
actuating an indicator in said passenger compartment when the motor oil in said reservoir is above said predetermined level.

9. The method according to claim 8 wherein the step of actuating comprises:
applying said pressure pulse to a normally vented passage;
blocking said normally vented passage when the sensor end of said dip tube is blocked by said motor oil; and
re-directing said pressure pulse when said normally vented passage is blocked to actuate said indicator.

10. The method according to claim 9 further comprising the steps of:
from a location inside said passenger compartment, selectively directing said pressure pulse to individual dip tubes having respective sensor ends located in respective liquid reservoirs in said vehicle.

* * * * *